US008543680B2

(12) United States Patent
Bavishi et al.

(10) Patent No.: US 8,543,680 B2
(45) Date of Patent: *Sep. 24, 2013

(54) MIGRATING DEVICE MANAGEMENT BETWEEN OBJECT MANAGERS

(71) Applicant: International Business Machines Corporation, Armonk, NY (US)

(72) Inventors: Pankaj S. Bavishi, Pune (IN); Shripad J. Nadgowda, Nagpur (IN); Sandeep R. Patil, Somers, NY (US); Dhaval K. Shah, Rajiv (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,828

(22) Filed: Feb. 5, 2013

(65) Prior Publication Data

US 2013/0159492 A1     Jun. 20, 2013

Related U.S. Application Data

(63) Continuation of application No. 13/216,141, filed on Aug. 23, 2011.

(51) Int. Cl.
*G06F 15/173* (2006.01)
*G06F 17/00* (2006.01)

(52) U.S. Cl.
USPC ........... 709/223; 709/224; 709/217; 709/218; 707/756; 707/960

(58) Field of Classification Search
USPC ............... 709/223, 224, 218, 217; 707/756, 707/960
See application file for complete search history.

(56) References Cited

U.S. PATENT DOCUMENTS

| 7,383,552 | B2 | 6/2008 | Hudis et al. |
| 7,522,050 | B2* | 4/2009 | Le .............................. 340/572.1 |
| 2006/0059253 | A1* | 3/2006 | Goodman et al. ............ 709/223 |
| 2008/0114771 | A1* | 5/2008 | Welingkar et al. .............. 707/10 |
| 2009/0113447 | A1 | 4/2009 | Kamiyai et al. |
| 2009/0132711 | A1 | 5/2009 | Groves et al. |
| 2009/0198814 | A1* | 8/2009 | Oono et al. ................... 709/224 |

(Continued)

OTHER PUBLICATIONS

Brooks et al., "IBM Tivoli Storage Manager for Advanced Copy Services", Doc. No. SG24-7474-00, Dec. 2006, 318 pgs.

(Continued)

*Primary Examiner* — Joseph Avellino
*Assistant Examiner* — Aftab Nasir Khan
(74) *Attorney, Agent, or Firm* — David W. Victor; Konrad, Raynes, Davda & Victor LLP

(57) ABSTRACT

Object manager information is maintained for object managers in a network indicating a device type of devices in the network managed by the object managers and device information providing information on the devices in the network, wherein the object managers have access to the object manager information. A determination is made from the object manager information a second object manager comprising one of the object managers in the network managing a same device type as the devices managed by the first object manager. The first and second object managers communicate to establish a migration relationship between the first and the second object managers. In response to a migration event at the second object manager, the first object manager accesses the device information for the second object manager to manage the devices currently managed by the second object manager.

10 Claims, 11 Drawing Sheets

(56) References Cited

U.S. PATENT DOCUMENTS

| | | | |
|---|---|---|---|
| 2009/0292801 A1 | 11/2009 | Yang et al. | |
| 2010/0083271 A1* | 4/2010 | Boykin et al. | 718/104 |
| 2011/0145418 A1* | 6/2011 | Pratt et al. | 709/227 |
| 2012/0323861 A1* | 12/2012 | Acuna et al. | 707/692 |
| 2013/0086066 A1* | 4/2013 | Anderson et al. | 707/737 |

OTHER PUBLICATIONS

Carey et al., "Heterogenous Tools for Heterogenous Network Management with WBEM", Adaptive Wireless Systems Group Department of Electronic Engineering, 2002, 7 pgs.

"Glossary",(Online) (Retrieved on Jul. 7, 2011), Retrieved from the internet from <URL:http://publib.boulder.ibm.com/infocenter/tivihelp/v4rl/topic/com.ibm.tp . . . , 7 pgs.

"CIM Interop Model White Paper", CIM Version 2.7, Distributed Management Task Force Inc. (DMTF), dated Jun. 19, 2003, 31 pgs.

Debusmann et al., "Unified Service Level Monitoring using CIM", Proceedings of the Seventh IEEE International Enterprise Distributed Object Computing Conference, 2003, 10 pgs.

Momm et al., "A Manageability Infrastructure for the Monitoring of Web Service Compositions", Institute of Telematics, 2008, 12 pgs.

Application entitled, Migrating Device Management Between Object Managers, U.S. Appl. No. 13/216,141, filed Aug. 23, 2011, by inventors Pankaj S. Bavishi et al, pp. 1-44.

Notice of Allowance, dated Apr. 24, 2013, for U.S. Appl. No. 13/216,141, filed Aug. 23, 2011, pp. 1-33.

\* cited by examiner

MIGRATING DEVICE MANAGEMENT BETWEEN OBJECT MANAGERS

RELATED APPLICATIONS

This patent application is a continuation of U.S. patent application Ser. No. 13/216,141, filed on Aug. 23, 2011, which patent application is incorporated herein by reference in its entirety.

BACKGROUND OF THE INVENTION

1. Field of the Invention

The present invention relates to a computer program product, system, and method for migrating device management between object managers.

2. Description of the Related Art

The Common Information Model (CIM) is an open standard that defines how managed elements in a network environment are represented as a common set of objects and relationships between them are represented to allow for the consistent management of these managed elements, independent of their manufacturer or provider. CIM allows multiple parties to exchange management information and to provide for the active control and management of the managed elements operating in a network environment, often including heterogeneous devices and elements from different manufactures. The goal of the common model is to allow for management software to be written once and work with many implementations of the common model without complex and costly conversion operations or loss of information.

In a CIM environment, any CIM client can talk to any CIM compliant managed element and entity in order to configure and manage the latter. With the widespread acceptance of CIM as a management standard, many of the vendors are providing CIM instrumentation for managing their devices. Vendor devices expose the management information through a software module called a CIM Agent. The CIM agent is either embedded in the device hardware or externally installed and configured to point to the managed device to report the management information. One CIM agent can report management information of multiple devices based on the configuration settings. CIM agent software is a set of software modules called CIM Providers that are plugged into a Common Information Model Object Manager (CIMOM).

Cloud computing is Internet based computing, whereby shared resources, software and information are provided to computers and other devices on-demand, like a public utility. Cloud computing infrastructure consists of reliable services delivered through data centers and built on servers. Clouds often appear as single points of access for consumer computing needs. With the advent of global public clouds/community clouds, multiple data centers comprised of a multitude of managed devices are evolving. Many of the cloud systems use the standard Distributed Management Task Force (DMTF) protocol components, such as a CIMOM, to manage devices in the cloud.

In current CIMOM managed clouds, a failure of a CIMOM managing various entities may terminate the management of the underlying management entities. In such case, another CIMOM must be provisioned to manage the device, which requires manual configuration, which increases the failure time for which the device is not manageable, also known as the Mean Time to Failure (MTTF).

CIMOM plays a vital role in both compute clouds (SaaS) as well as infrastructure clouds (IaaS) by enabling the cloud provider to manage the consolidated shared infrastructure. A failure of a CIMOM in a cloud spanning across multiple data centers which potentially have thousands of managed devices could result in the inaccessibility of all the numerous devices managed by the CIMOM. A CIMOM failure may impact the availability of cloud services and reduce service to the point where a service level agreement (SLA) is violated.

SUMMARY

Provided are a computer program product, system, and method for migrating device management between object managers. Object manager information is maintained for object managers in a network indicating a device type of devices in the network managed by the object managers and device information providing information on the devices in the network, wherein the object managers have access to the object manager information. A determination is made from the object manager information a second object manager comprising one of the object managers in the network managing a same device type as the devices managed by the first object manager. The first and second object managers communicate to establish a migration relationship between the first and the second object managers. In response to a migration event at the second object manager, the first object manager accesses the device information for the second object manager to manage the devices currently managed by the second object manager.

DETAILED DESCRIPTION

Described embodiments provide techniques to allow for object managers that manage devices in a network or cloud computing environment to establish a migration relationship. If a migration event occurs, such as a planned or unplanned unavailability of one object manager in the relationship, known as the source object manager, then the management of some or all of the devices managed by the source object manager may be transferred to one other object manager in the relationship, known as the target object manager. This provides for an automatic and seamless migration of device management responsibilities from one object manager to another in a manner that avoids disruption to the management and access of the devices being managed by the source object manager subject to the actual or pending unavailability.

Figure 1:
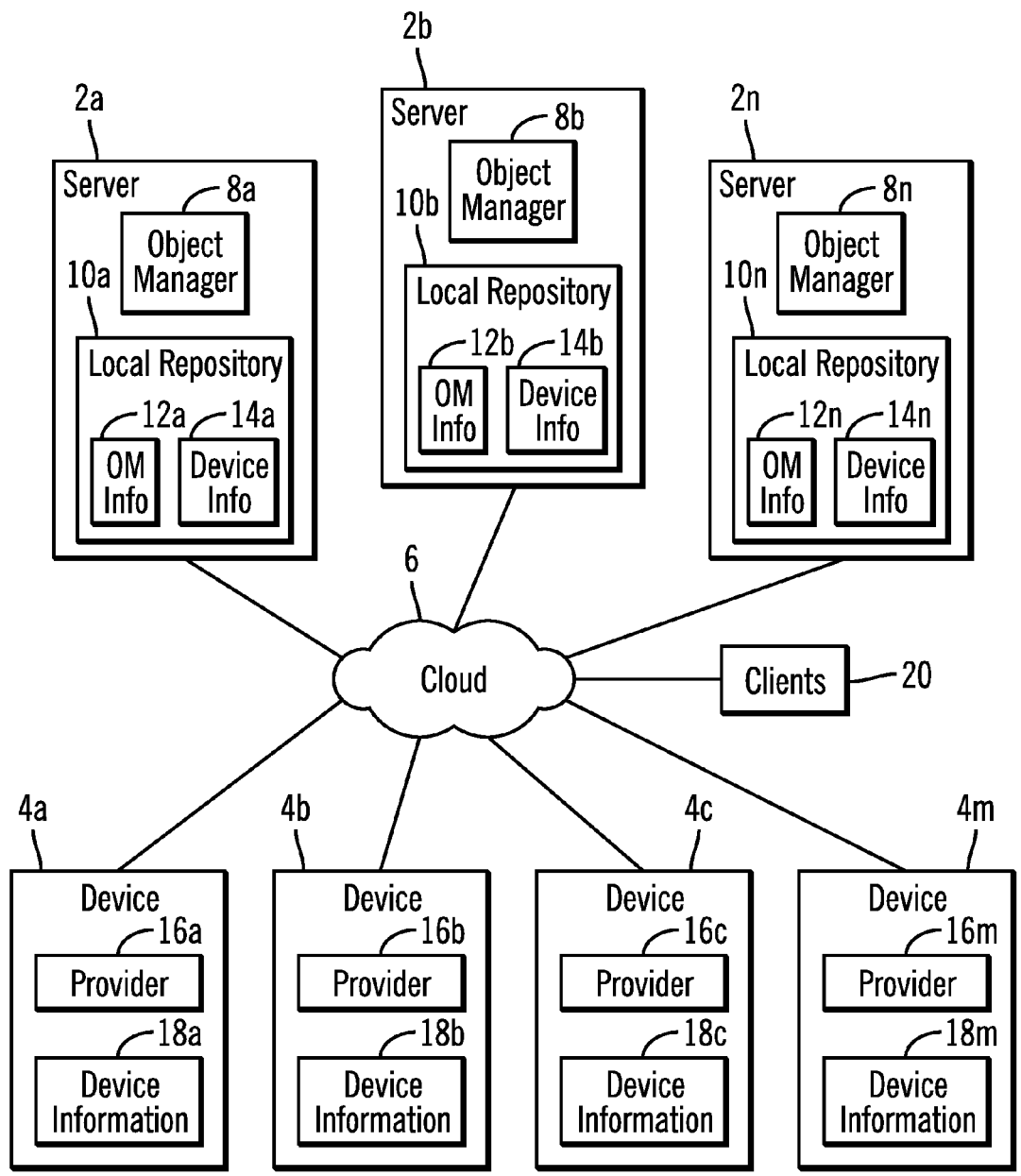
FIG. 1 illustrates a computing environment in which embodiments are implemented.

FIG. 1 illustrates a cloud or network computing environment having a plurality of servers 2a, 2b . . . 2n that are in communication with managed devices 4a, 4b, 4c . . . 4m over a cloud 6. The servers 2a, 2b . . . 2n each include an object manager 8a, 8b . . . 8n, where each object manager 8a, 8b . . . 8n provides management of heterogeneous or similar device types, and wherein different of the object managers 8a, 8b . . . 8n may manage the same or different device types. Types of managed devices or elements may comprise device types such as storage, switch, printer, database, copy services, backup services and other computational services and managed elements. The object managers 8a, 8b . . . 8n may maintain a local repository 10a, 10b . . . 10n having object manager information 12a, 12b . . . 12n on other object managers 8a, 8b . . . 8n and device information 14a, 14b . . . 14n providing information on devices 4a, 4b, 4c . . . 4n in the network. In one embodiment, the object manager information 12a, 12b . . . 12n may only include information on other object managers 8a, 8b . . . 8n managing a same device type as the device type managed by the object manager 8a, 8b . . . 8n maintaining the object manager information 12a, 12b . . . 12n.

Each device 4a, 4b, 4c . . . 4m includes a provider 16a, 16b, 16c . . . 16m that provides a device specific handler that serves as a plug-in for the object manager 8a, 8b . . . 8n managing the device 4a, 4b, 4c . . . 4m, where the object manager 8a, 8b . . . 8n uses the provider 16a, 16b, 16c . . . 16m to interface with the device 4a, 4b, 4c . . . 4m being managed. Each device 4a, 4b, 4c . . . 4m further includes device information 18a, 18b, 18c . . . 18m providing information on the device 4a, 4b, 4c . . . 4m.

Clients 20 provide requests for services from the devices 4a, 4b, 4c . . . 4m to the object manager 8a, 8b . . . 8n managing the device 4a, 4b, 4c . . . 4m providing the service requested by the clients 20.

In one embodiment, the object managers 8a, 8b . . . 8n may comprise Common Information Model (CIM) Object Managers (CIMOMs). A CIMOM provides a common conceptual framework for data management that receives, validates, and authenticates the CIM requests from client 20 applications for services offered by the devices 4a, 4b, 4c . . . 4m the CIMOM is managing. The CIMOMs 8a, 8b . . . 8n direct client 20 requests to the appropriate device provider 16a, 16b, 16c . . . 16n. The clients 20 may comprise CIM clients that direct CIM requests for device services to the CIMOM 8a, 8b . . . 8n managing the device 4a, 4b, 4c . . . 4n providing the services sought by the clients 20. In an alternative embodiment, the object managers 8a, 8b . . . 8n may implement an object manager framework other than CIM.

The servers 2a, 2b . . . 2n, devices 4a, 4b, 4c . . . 4m, and clients 20 may be implemented in separate computer devices that communicate over the cloud 6, where the cloud 6 may comprise one or more networks, such as a local area network (LAN), storage area network (SAN), wide area network (WAN), etc. The object managers 2a, 2b . . . 2n, devices 4a, 4b, 4c . . . 4m and clients 20 may extend across multiple data centers involving numerous managed devices. In a further embodiment, multiple object managers 8a, 8b . . . 8n may be implemented as different operating system images in one server 2a, 2b . . . 2n that communicate over different ports on the server.

The variables "m" and "n" are used to represent a variable positive integer number of element, such as variable number of servers, object managers, devices, providers, object management information, device information, local repositories, etc. These variables associated with different elements may comprise a same or different integer value.

The object managers 8a, 8b . . . 8n and providers 16a, 16b, 16c . . . 16m may comprise software programs in a memory executed by a processor. In an alternative embodiment, some portion or all of the programs 8a, 8b . . . 8n and 16a, 16b, 16c . . . 16m may be implemented in a hardware component, such as a dedicated integrated circuit, e.g., Application Specific Integrated Circuit (ASIC), expansion card, etc.

Figure 2:
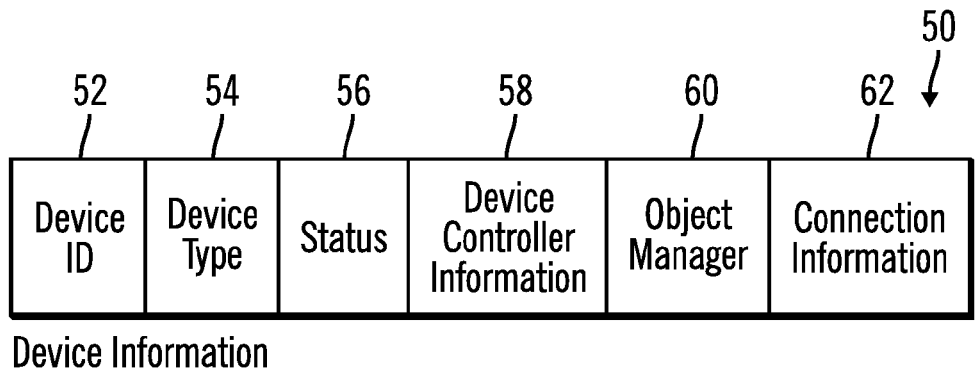
FIG. 2 illustrates an embodiment of device information.

FIG. 2 illustrates an embodiment of device information 50, which may comprise an instance of the device information for a device maintained in the local repository 10a, 10b . . . 10n or the local device information 18a, 18b, 18c . . . 18m at the devices 4a, 4b, 4c . . . 4m. The device information 50 includes a device identifier (ID) 52 identifying the device; a device type 54 indicating a type of the device, such as switch, storage, database, copy services function or other computational device or service, comprising hardware and/or software; a status 56 of the device, such as availability, health, available resources, etc.; device controller information 58 needed to access the device 52, such as network address (e.g., Internet Protocol (IP) address), port, username, password, protocol, etc.; an object manager 60 managing the device 52; and connection information 62 to communicate with the device 52, such as Internet Protocol (IP), hostname, subnet, etc.

Figure 3:
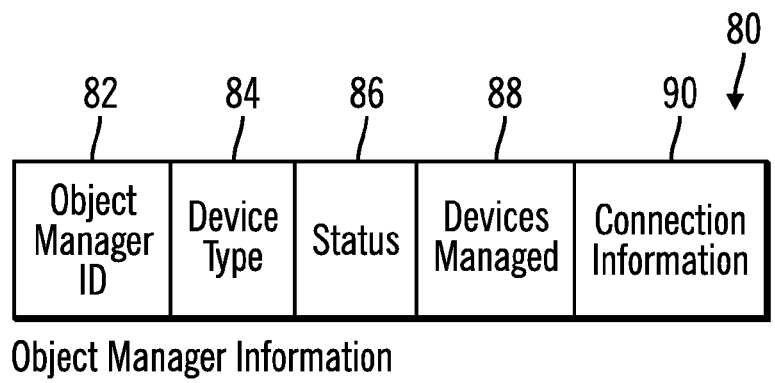
FIG. 3 illustrates an embodiment of object manager information.

FIG. 3 illustrates an embodiment of object manager information 80 for one object manager 8a, 8b . . . 8n maintained in the object manager information 12a, 12b . . . 12n, including an object manager identifier (ID) 82 identifying the object manager 8a, 8b . . . 8n; a device type 84 indicating a type of the device managed by the object manager 72, such as switch, storage, database, copy services function or other computational device or service; a status 86 of the object manager 82, such as availability, health, available resources, etc.; devices managed 88 by the identified object manager 82, such as the device IDs 52; and connection information 90 providing information needed to connect with the object manager 82 in the cloud 6; and devices managed 88 by the object manager 82.

Figure 4:
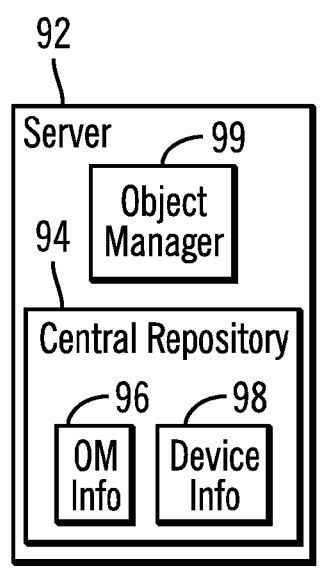
FIG. 4 illustrates an embodiment of a server having a central repository.

FIG. 4 illustrates an embodiment of a server 92 in the cloud 6 that maintains a central repository 94 having object manager information 96 for all object managers 8a, 8b . . . 8n in a network or subnet accessible in the cloud 6 and device information 98 providing information on devices 4a, 4b, 4c . . . 4m managed by the object managers 8a, 8b . . . 8n in the cloud 6. The server 92 may further include an object manager 9 or other interface code, such as CIM code. In one embodiment, all the object managers 8a, 8b . . . 8n may access the information in the central repository. In an alternative embodiment, the object managers 8a, 8b . . . 8n may maintain device and object manager information in a local repository 10a, 10b . . . 10n.

Figure 5:
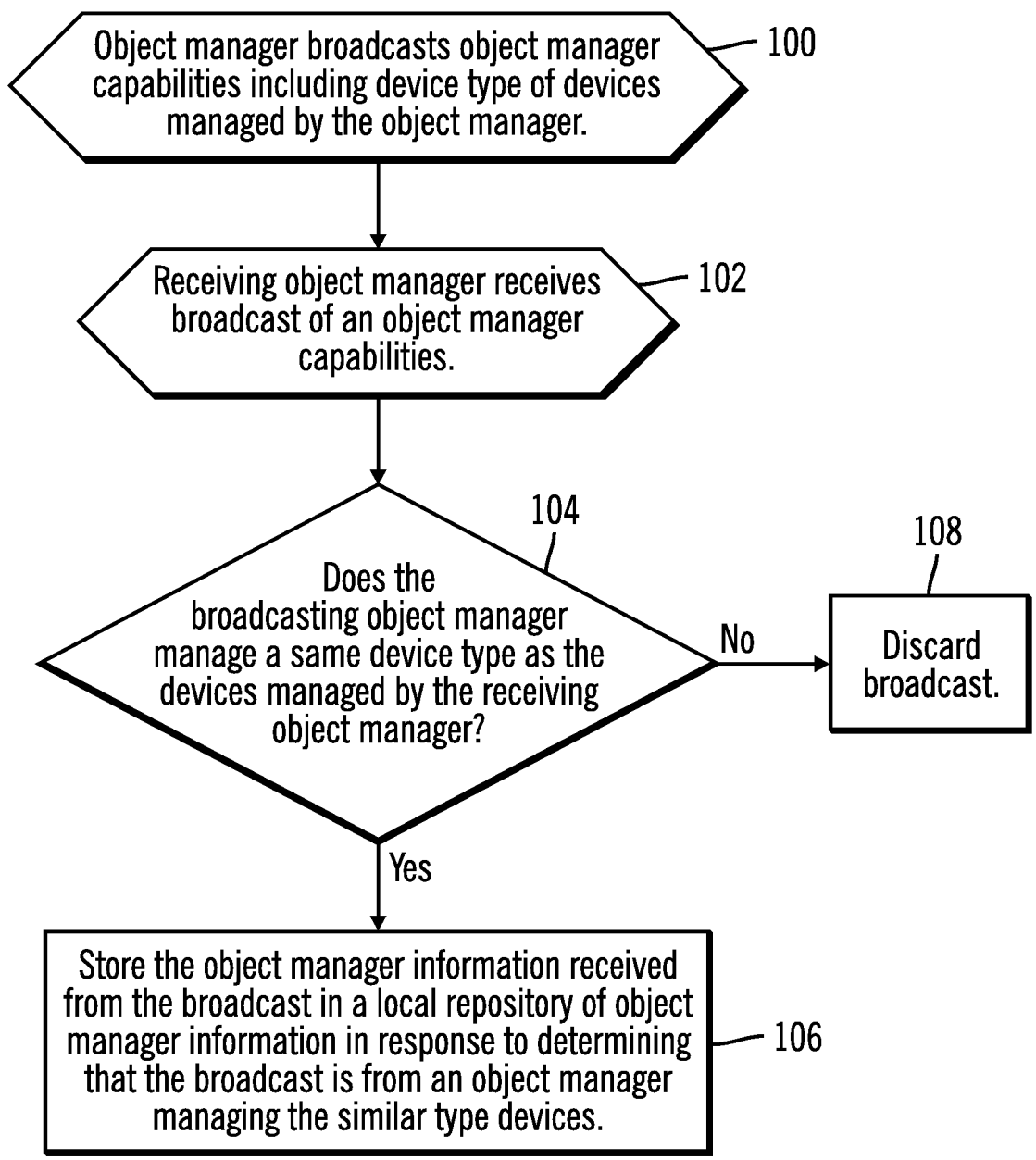
FIG. 5 illustrates an embodiment of operations to broadcast object manager capabilities.

FIG. 5 illustrates an embodiment of operations performed by object managers 8a, 8b . . . 8n to broadcast and receive object manager information 50. The object managers 8a, 8b . . . 8n broadcast (at block 100) in the cloud 6, such as within a subnet of the cloud 6, information on their capabilities, including a device type of devices managed by the object manager 8a, 8b . . . 8n, and other information such as shown in FIG. 3. Blocks 102-108 illustrate an embodiment of operations performed by the object manager 8a, 8b . . . 8m receiving the broadcasts, i.e., receiving object managers 8a, 8b . . . 8n.

At block 102, a receiving object manager 8a, 8b . . . 8n receives the broadcast of object manager capabilities. If (at block 104) the receiving object manager 8a, 8b . . . 8n determines that the broadcasting object manager manages a same device type as the devices managed by the receiving object manager 8a, 8b . . . 8n, then the receiving object manager 8a, 8b . . . 8n stores (at block 106) the object manager information received from the broadcast in a local repository 10a, 10b . . . 10n of object manager information 12a, 12b . . . 12n. Otherwise, if the broadcasting object manager manages devices of a different device type than those managed by the receiving object manager 8a, 8b . . . 8n, then the broadcast is discarded (at block 108). In this way, object managers 8a, 8b . . . 8n gather information on other object managers that manage a same device type as the devices managed by the object manager maintaining the object manager information 12a, 12b . . . 12n.

Figure 6:
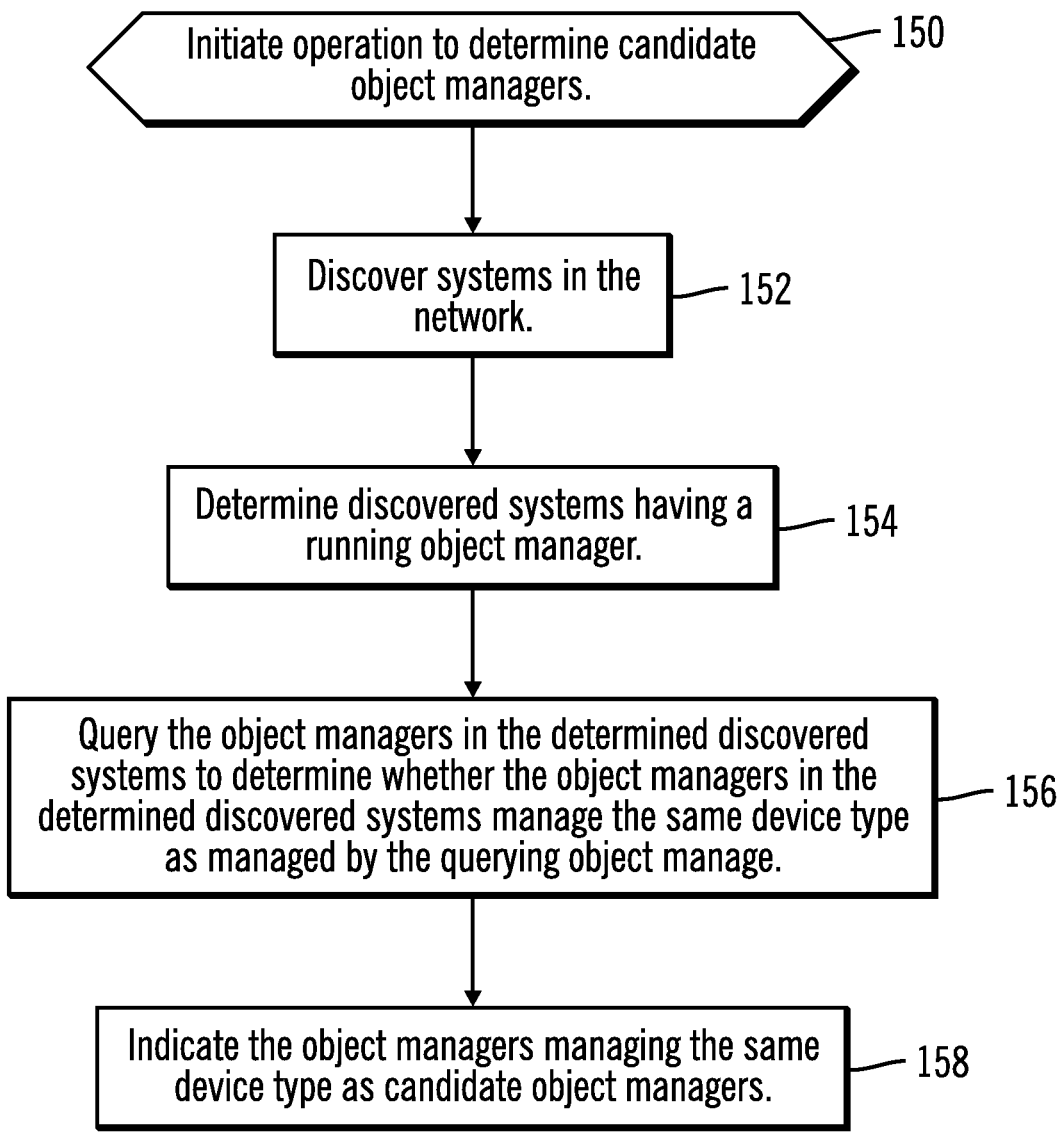
FIG. 6 illustrates an embodiment of operations to determine candidate object managers.

FIG. 6 illustrates an embodiment of operations performed by the object managers 8a, 8b . . . 8n to determine candidate object managers with which to establish a migration relationship. The object managers 8a, 8b . . . 8n in a migration relationship will provide redundancy and failover services for each other. Upon initiating (at block 150) an operation to determine candidate object managers, the object manager 8a, 8b . . . 8n discovers (at block 152) systems 2a, 2b . . . 2n in the network. The object manager 8a, 8b . . . 8n queries the discovered systems 2a, 2b . . . 2n to determine (at block 154) discovered systems having a running object manager 8a, 8b . . . 8n. The object manager 8a, 8b . . . 8n then queries (at block 156) the object managers 8a, 8b . . . 8n in the determined discovered systems to determine whether the object managers in the determined discovered systems manage the same device type as managed by the querying object manager. The querying object manager 8a, 8b . . . 8n indicates (at block 158) the queried object managers 8a, 8b . . . 8n managing the same device type as candidate object managers in the object manager information 12a, 12b . . . 12n.

Figure 7:
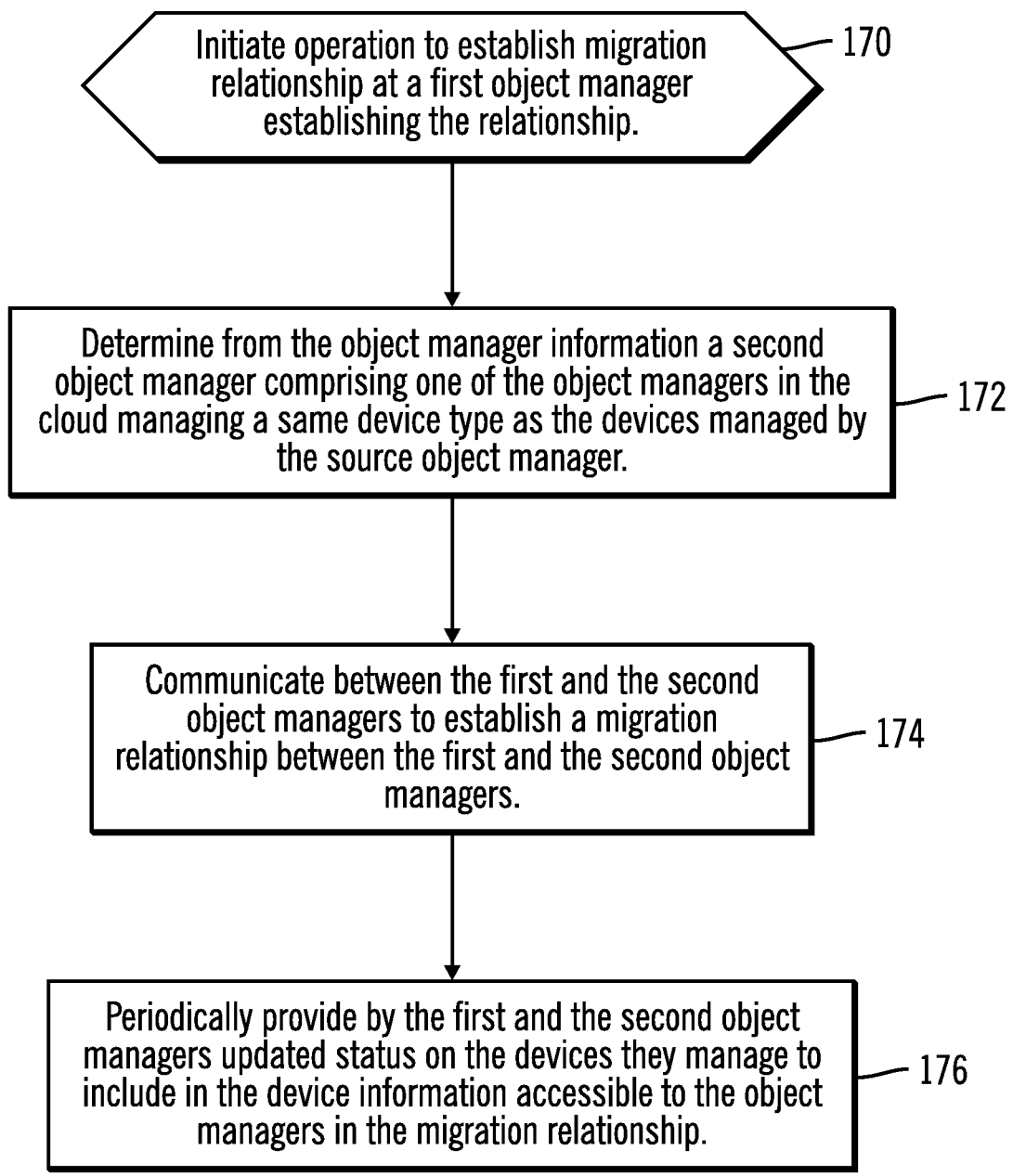
FIG. 7 illustrates an embodiment of operations to establish a migration relationship.

FIG. 7 illustrates an embodiment of operations performed by the object managers 8a, 8b . . . 8n to establish a migration relationship with at least one other object manager 8a, 8b . . . 8n, where object managers in a same migration relationship provide redundancy and failover services for each other. Upon initiating (at block 170) operations to establish the migration relationship, a first object manager 8a, 8b . . . 8n, comprising the object manager 8a, 8b . . . 8n establishing the relationship, determines (at block 172) from the object manager information 12a, 12b . . . 12n a second object manager 8a, 8b . . . 8n in the cloud 6 managing a same device type as the devices managed by the first object manager. The first and the second object managers 8a, 8b . . . 8n communicate (at block 174) with each other to establish a migration relationship therebetween. The first and the second object managers 8a, 8b . . . 8n periodically provide (at block 176) updated status on the devices 4a, 4b, 4c . . . 4m they manage to each other to include in the device information 12a, 12b, 12c . . . 12m or 96 accessible to the object managers in the migration relationship. The object managers 8a, 8b . . . 8n in a relationship may store relationship information with their object manager information 12a, 12b . . . 12n or 96, or elsewhere in the local 10a, 10b . . . 10n or central 94 repositories.

In one embodiment, the object managers 8a, 8b . . . 8n in a migration relationship may transmit the updated device status information directly to each other so that the updated status may be stored in the local device information 14a, 14b . . . 14n in their respective local repository 10a, 10b . . . 10n. Alternatively, if a central repository 94 is used, then the object managers 8a, 8b . . . 8n in the relationship may transmit updated device status to the device information 98 in the central repository 94. The object managers 8a, 8b . . . 8n may provide updated device status when receiving updated device information 50 from the providers 16a, 16b, 16c . . . 16m in the devices 4a, 4b, 4c . . . 4m they manage.

Although a migration relationship is discussed with respect to first and second object managers, there may be more than two object managers in a migration relationship.

Figure 8:
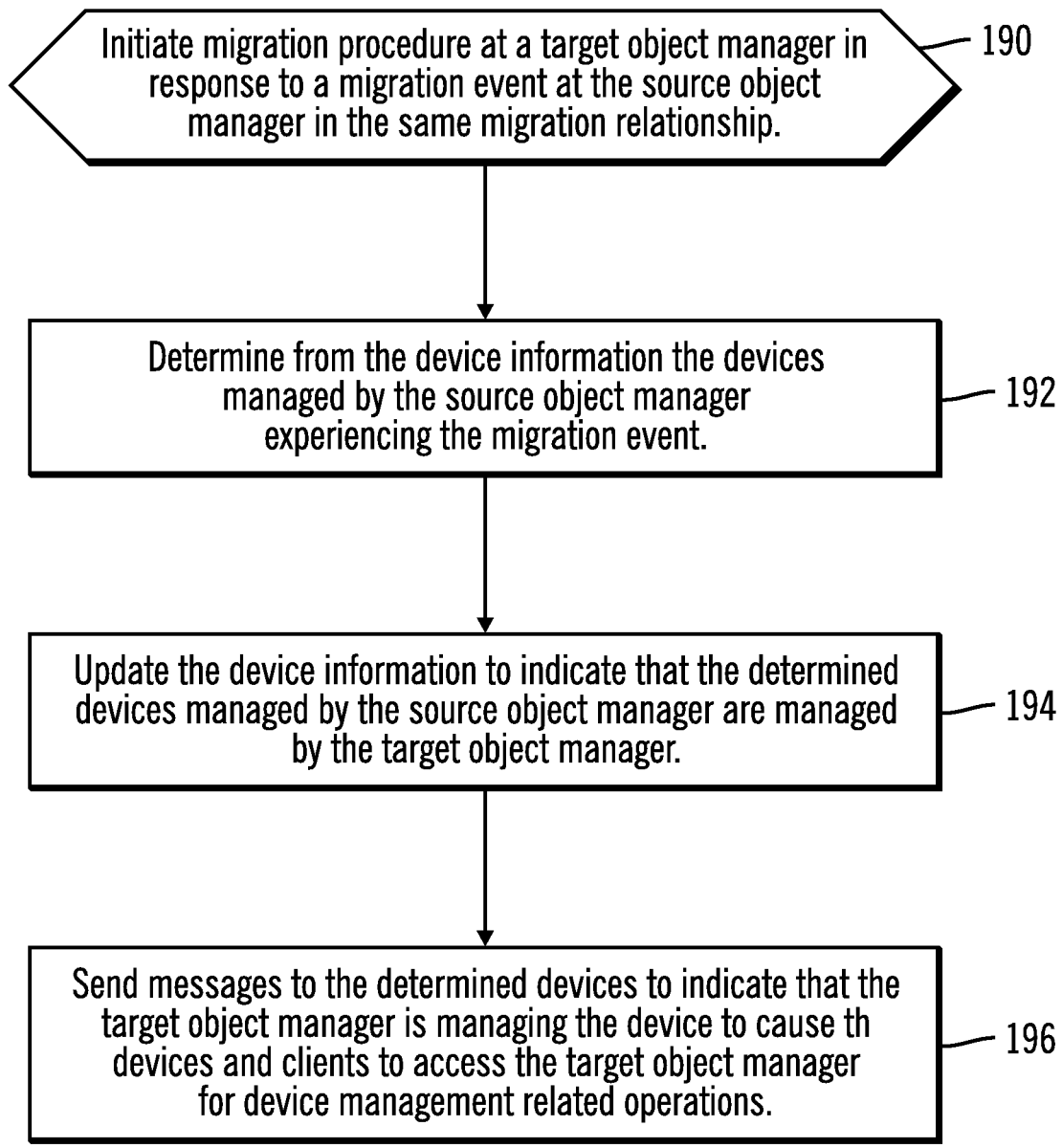
FIG. 8 illustrates an embodiment of operations to initiate a migration procedure.

FIG. 8 illustrates an embodiment of operations performed by the target object manager to manage a migration event at the source object manager which causes the migration of management responsibility for devices from the source object manager to the target object manager. A migration event causing the migration of the device management responsibility from the source object manager to the target object manager may comprise a sudden or planned unavailability at the source object manager 8a, 8b . . . 8n, which may result from an anticipated or unanticipated failure, hardware or service upgrade, path failure to the object manager, maintenance, load balancing operation, reassignment, etc. Either of the first and second object managers in a migration relationship may operate as the source object manager from which device management responsibility is migrated to the target object manager in response to the migration event. Upon initiating (at block 190) a migration procedure at the target object manager for a source object manager in the same migration relationship, the target object manager 8a, 8b . . . 8n determines (at block 192) from the device information 14a, 14b . . . 14n or 98 the devices 4a, 4b, 4c . . . 4m managed by the source object manager experiencing the migration event. The target object manager 8a, 8b . . . 8n updates (at block 194) the device information 14a, 14b . . . 14n or 98 to indicate that the determined devices 4a, 4b, 4c . . . 4m managed by the source object manager are managed by the target object manager. The target object manager 8a, 8b . . . 8n may take over management of some or all of the devices being managed by the source object manager 8a, 8b . . . 8n according to a predefined setting of devices to take over or according to indication by the source or target object manager 8a, 8b . . . 8n of the devices reassign to the target object manager. The target object manager 8a, 8b . . . 8n sends (at block 196) messages to the determined devices 4a, 4b, 4c . . . 4m to indicate that the target object manager 8a, 8b . . . 8n is managing the device to cause the devices 4a, 4b . . . 4n and clients 20 to access the target object manager 8a, 8b . . . 8c for device management and access related operations.

Figure 9:
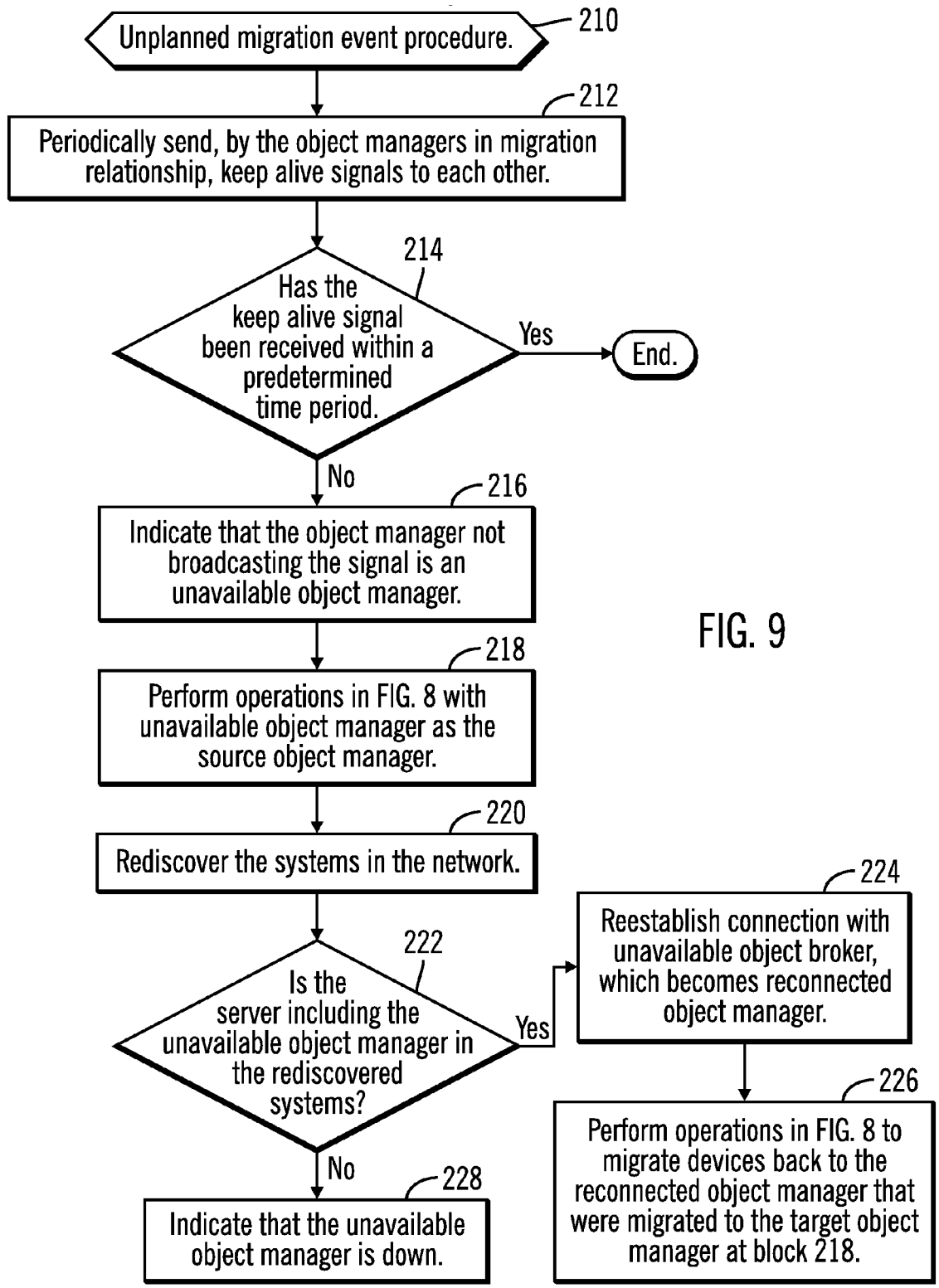
FIG. 9 illustrates an embodiment of operations for an unplanned migration event procedure.

FIG. 9 illustrates an embodiment of operations performed by the object managers 8a, 8b . . . 8n in a migration relationship when an unexpected migration event occurs, which comprises a migration event not coordinated by the source object manager, such as if there is a sudden failure or unavailability. For unplanned migration event processing (at block 210), the object managers 8a, 8b . . . 8n in the migration relationship periodically send (at block 212) keep alive signals to each other. If (at block 214) one object manager in the migration relationship detects that the keep alive has not been received within a predetermined time period from another object manager 8a, 8b . . . 8n the relationship, then the detecting object manager assumes that a migration event has occurred at the other object manager 8a, 8b . . . 8n. In such case, the object manager detecting the absence of the keep alive signal indicates (at block 216) that the object manager not broadcasting the signal is an unavailable object manager. The detecting object manager 8a, 8b . . . 8n performs (at block 218) the operations in FIG. 8 to cause the migration of the management of the devices managed by the unavailable object manager 8a, 8b . . . 8n, having the detected migration event, to the target or detecting object manager 8a, 8b . . . 8n.

The detecting object manager may perform an operation to rediscover (at block 220) systems in the cloud 6. If (at block 222) the server 2a, 2b ... 2n including the unavailable object manager is one of the rediscovered systems, then the detecting object manager 8a, 8b ... 8n reestablishes (at block 224) connection with the unavailable object manager 8a, 8b ... 8n, which then becomes reconnected object manager 8a, 8b ... 8n. The detecting object manager 8a, 8b ... 8n may then perform (at block 226) the operations in FIG. 8 to migrate devices back to the reconnected object manager 8a, 8b ... 8n that were previously migrated to the detecting object manager at block 218 when the reconnected object manager became unavailable. If (at block 222) the server 2a, 2b ... 2n including the unavailable object manager is not one of the rediscovered servers 2a, 2b ... 2n, then the detecting object manager may indicate (at block 228) that the unavailable object manager 8a, 8b ... 8n is down.

Figure 10:
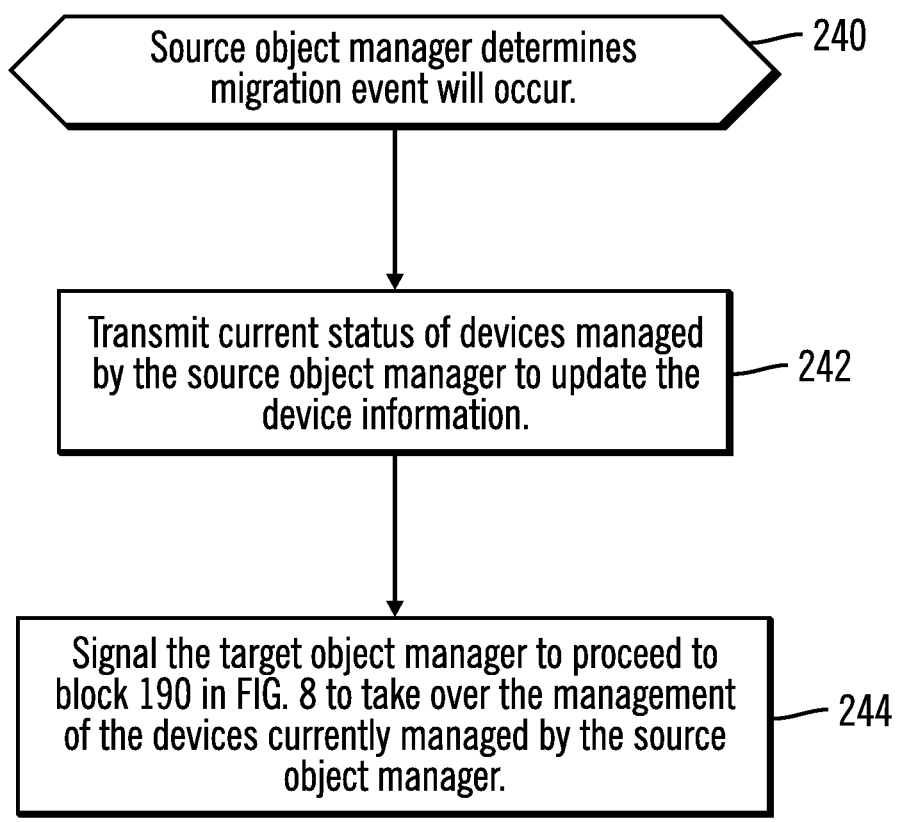
FIG. 10 illustrates an embodiment of operations for a planned migration event.

FIG. 10 illustrates an embodiment of operations performed by a source object managers 8a, 8b ... 8n in a migration relationship to perform a planned migration event, such as if the source object manager 8a, 8b ... 8n plans for a shutdown, servicing or reassignment of devices. Upon the source object manager 8a, 8b ... 8n planning for a migration event (at block 240), the source object manager 8a, 8b ... 8n transmits (at block 242) current status of devices managed by the source object manager 8a, 8b ... 8n to reassign to update the device information 12a, 12b ... 12n maintained in a local repository 10a, 10b ... 10n or to update device information 98 in a central repository 94. The source object manager signals (at block 244) the target object manager a8a, 8b ... 8n to proceed to block 190 in FIG. 8 to take over the management of the devices 4a, 4b, 4c ... 4m currently managed by the source object manager.

With the described embodiments, the migration relationship avoids a single point of failure for object managers managing devices in the cloud 6 by providing a protocol for automated migration of the management of devices from a source object manager to a target object manager in a migration relationship. The described embodiments avoid Mean Time to Failure (MTTF) for object managers and allow users to continue managing and accessing the device even after a migration event or failure at one object manager in the relationship by automatic migration of the device management responsibilities to the available object manager in the relationship managing the same device type. This allows for the management operations performed by an object manager to continue even if the object manager for the devices fails or otherwise becomes unavailable.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 11-13. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
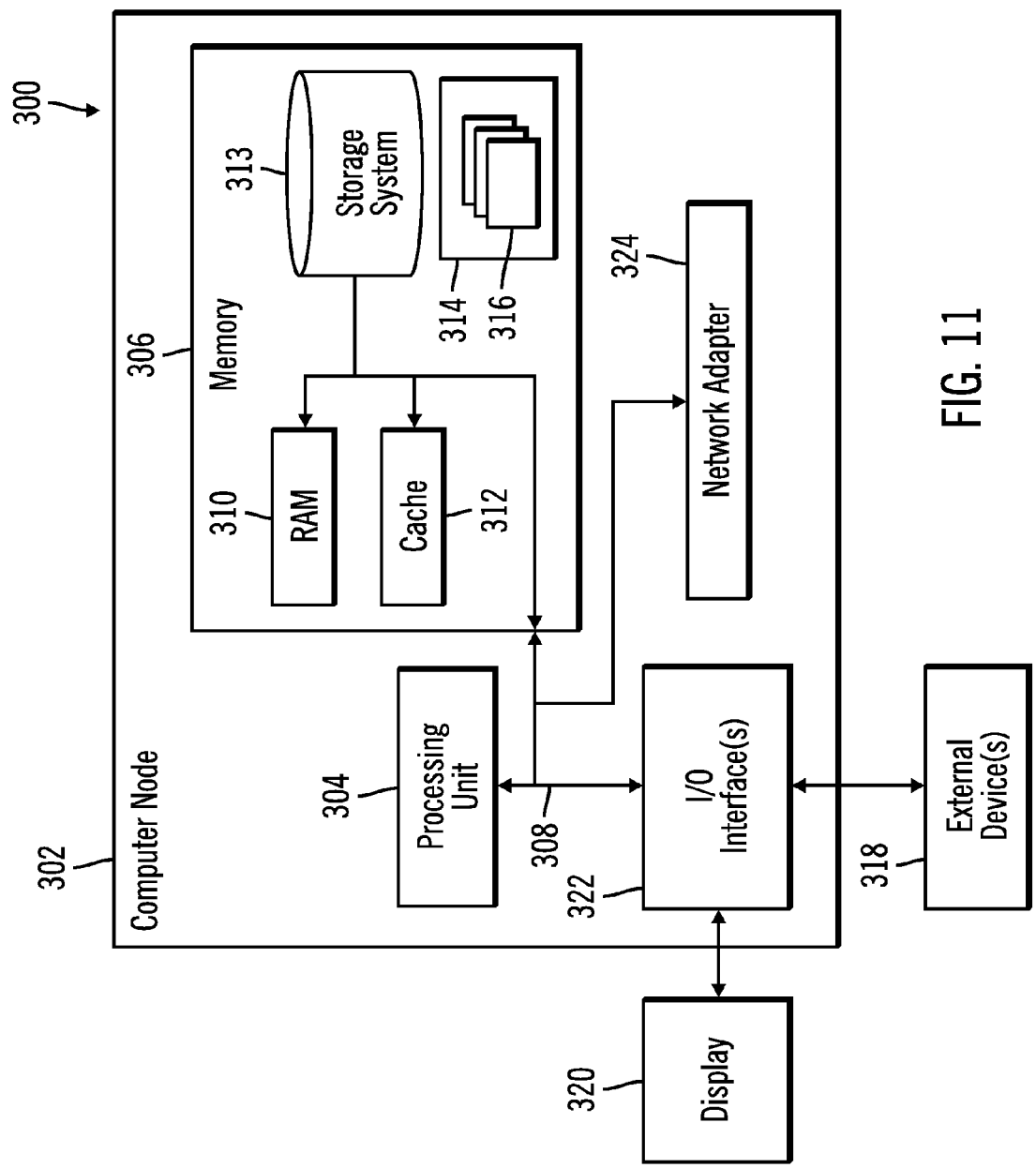
FIG. 11 illustrates an implementation of a node in the network computing embodiment.

FIG. 11 illustrates an embodiment of a cloud computing node 300 which may comprise an implementation of the servers 2a, 2b . . . 2n, devices 4a, 4b, 4c . . . 4n, and client 20 components, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 12:
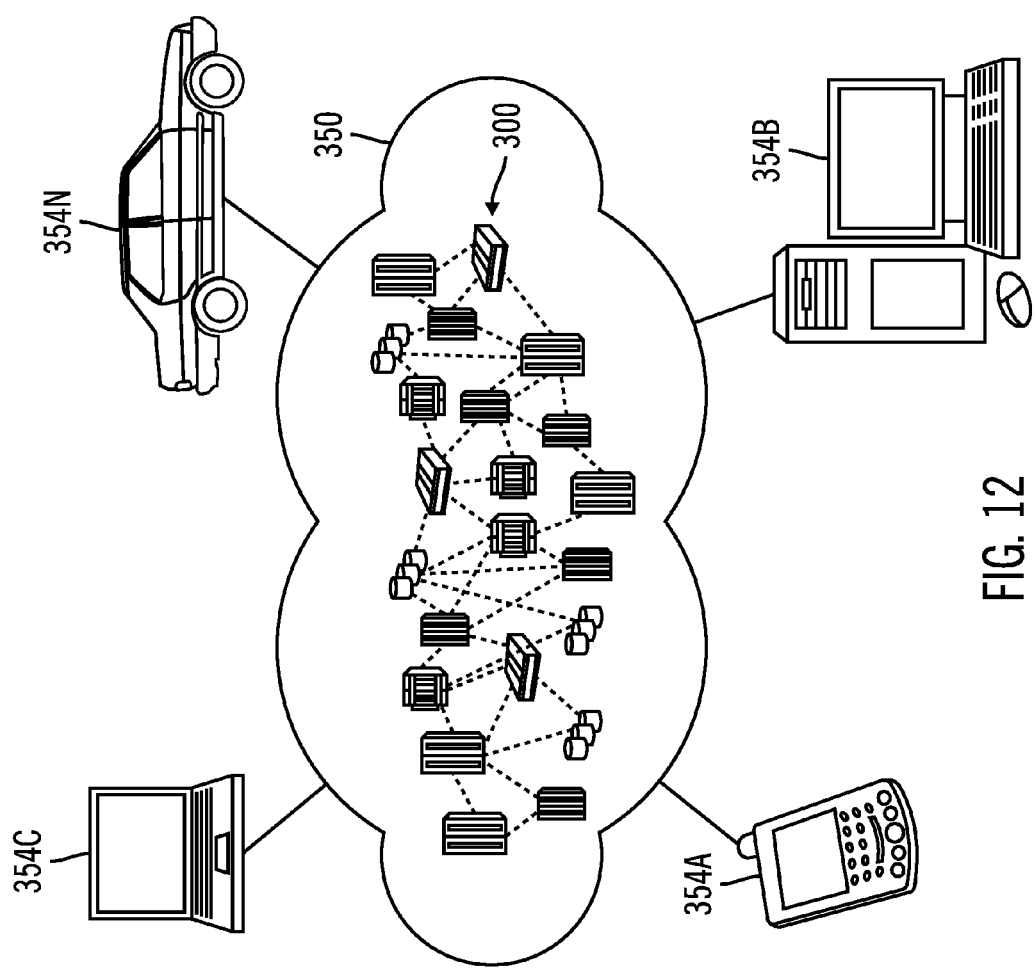
FIG. 12 illustrates an embodiment of a cloud computing environment.

Referring now to FIG. 12, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 12 are intended to be illustrative only and that computing nodes 300 and cloud computing environment 350 can communicate with any type of computerized device over any type of network and/or network addressable connection (e.g., using a web browser).

Figure 13:
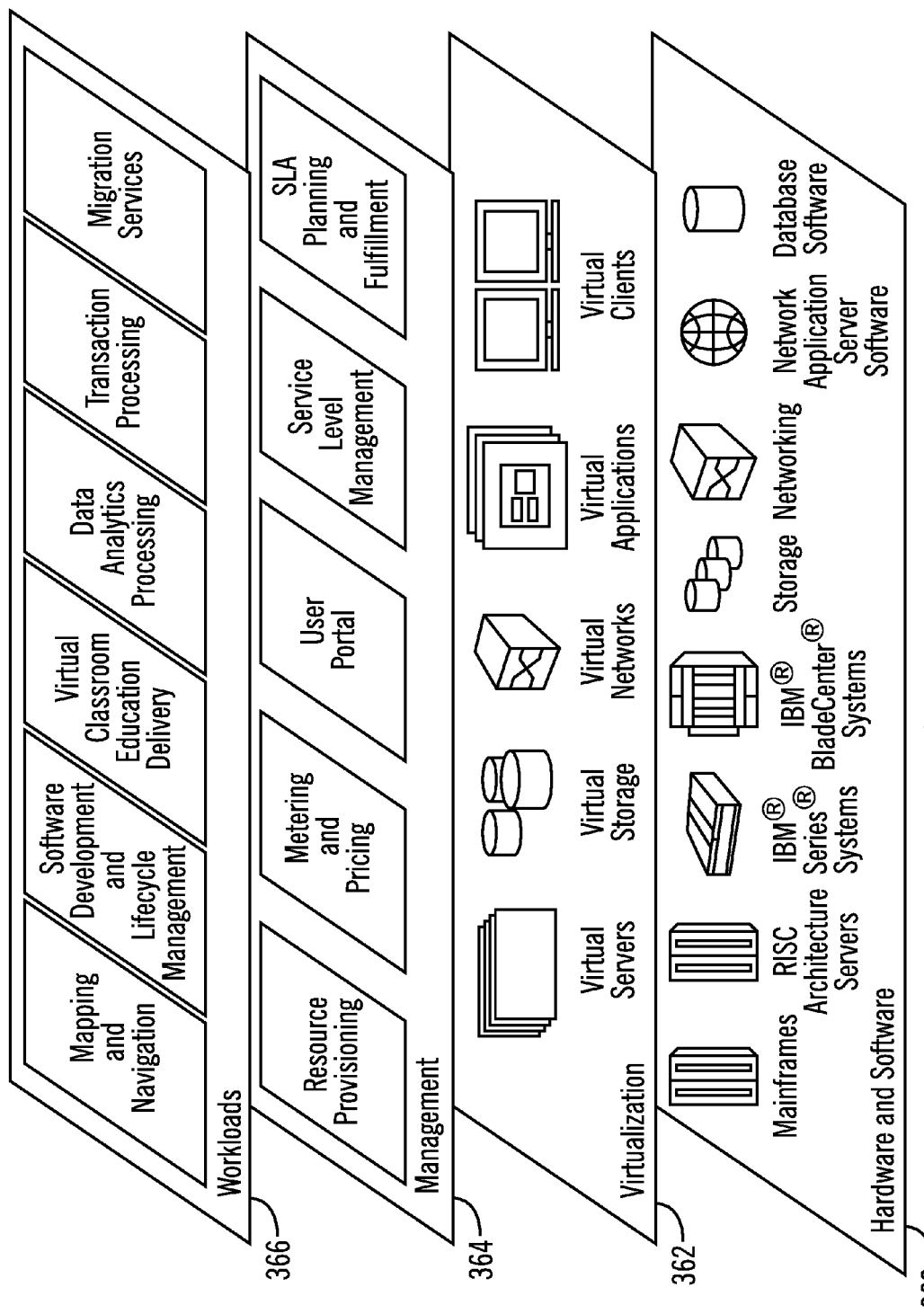
FIG. 13 illustrates an embodiment of abstraction model layers of a cloud computing environment.

Referring now to FIG. 13, a set of functional abstraction layers provided by cloud computing environment 350 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2C®, database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the object manager migration services, such as described with respect to FIGS. 1-10, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for managing object managers in a network, comprising:
  maintaining object manager information for object managers in a network indicating a device type of devices in the network managed by the object managers and device information providing information on the devices in the network, wherein the object managers have access to the object manager information;
  sending, over the network, object manager capabilities of a first object manager in a first computing device, including the device type of devices managed by the first object manager;
  receiving object manager capabilities over the network from one of the object managers over the network;
  determining, by the first object manager, comprising one of the object managers, from the object manager information a second object manager in a second computing device comprising one of the object managers in the network managing a same device type as the devices managed by the second object manager;
  communicating, between the first and the second object managers, to establish a migration relationship between the first and the second object managers; and
  in response to a migration event at the second object manager, accessing, by the first object manager, the device information to manage the devices currently managed by the second object manager.

2. The method of claim 1, further comprising:
  broadcasting over the network, by each object manager, object manager capabilities of the object manager, including a device type of devices managed by the object manager;
  determining, by the object managers receiving broadcasts, whether the broadcast is from an object manager managing the same device type as the devices managed by the receiving object manager; and
  storing, by the receiving object managers, the object manager information received from broadcasts in a local repository of object manager information in response to determining that the broadcast is from an object manager managing the same device type as the receiving object manager, wherein the first object manager determines the second object manager from the object manager information in the local repository for object managers managing the same device type as the second object manager.

3. The method of claim 1, further comprising:

discovering by the object managers systems in the network;
- determining, by the object managers, discovered systems having a running object manager;
- querying, by the object managers, the object managers in the determined discovered systems to determine whether the object managers in the determined discovered systems manage the same device type as managed by the second object manager; and
- indicating, by the object managers, the object managers managing the same device type as candidate object managers, wherein the second object manager comprises one of the indicated candidate object managers for the first object manager.

4. The method of claim 1, further comprising:
- periodically sending, by the first and the second object managers in the migration relationship, keep alive signals to each other; and
- determining, by the first object manager, that the keep alive signal has not been received from the second manager within a predetermined time period, wherein the migration event causing the first object manager to manage the devices managed by the second object manager comprises determining that the keep alive signal has not been received from the second object manager within the predetermined time period;

rediscovering the systems in the network;
- determining whether a server including the second object manager was rediscovered; and
- reconnecting to the second object manager in response to determining that the server including the second object manager was rediscovered.

5. The method of claim 1, further comprising:
- determining, by the second object manager, that a migration event will occur; and
- in response to determining the migration event will occur, performing:
  - transmitting current status of devices managed by the second object manager to update the device information; and
  - signaling the first object manager to take over the management of the devices currently managed by the second object manager.

6. The method of claim 1, wherein the object managers comprise Common Information Model (CIM) object managers (CIMOMs) implemented in at least one server system communicating in the network.

7. The method of claim 1, further comprising:
- periodically providing, by the first and second object managers in the migration relationship, updated status on the devices managed by the first and second object managers to include in the device information accessible to the first and second object managers;
- wherein initiating the operation to have the first object manager manage the devices managed by the second object manager comprises:
  - determining, by the first object manager, from the device information the devices managed by the second object manager; and
  - updating, by the first object manager, the device information to indicate that the determined devices managed by the second object manager are managed by the first object manager.

8. The method of claim 7, further comprising:
- sending, by the first object manager, messages to the determined devices to indicate that the first object manager is managing the device to cause the devices to access the first object manager for device management related operations.

9. The method of claim 7, wherein the object manager information for each object manager and the device information for the devices in the network are maintained at a central repository accessible to the object managers, and wherein the object managers provide the updated status on the devices they manage to the central repository.

10. The method of claim 7, wherein the object managers locally maintain object manager information for object managers managing devices of the same device type managed by the object manager maintaining the object manager information, and wherein the first and second object managers locally maintains the device information for the devices managed by the first and second object managers.

* * * * *